United States Patent
Kim et al.

(10) Patent No.: US 10,693,182 B2
(45) Date of Patent: Jun. 23, 2020

(54) POSITIVE ELECTRODE FOR SECONDARY BATTERY, MANUFACTURING METHOD THEREOF, AND LITHIUM SECONDARY BATTERY INCLUDING SAME

(71) Applicant: LG Chem, Ltd., Seoul (KR)

(72) Inventors: Hye Bin Kim, Daejeon (KR); Jong Keon Yoon, Daejeon (KR); Song Taek Oh, Daejeon (KR); Jung Seok Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/073,492

(22) PCT Filed: Nov. 22, 2017

(86) PCT No.: PCT/KR2017/013342
§ 371 (c)(1),
(2) Date: Jul. 27, 2018

(87) PCT Pub. No.: WO2018/097594
PCT Pub. Date: May 31, 2018

(65) Prior Publication Data
US 2019/0013545 A1 Jan. 10, 2019

(30) Foreign Application Priority Data
Nov. 23, 2016 (KR) .................. 10-2016-0156827
Nov. 21, 2017 (KR) .................. 10-2017-0155472

(51) Int. Cl.
*H01M 10/0525* (2010.01)
*H01M 4/04* (2006.01)
(Continued)

(52) U.S. Cl.
CPC ......... *H01M 10/0525* (2013.01); *H01M 4/04* (2013.01); *H01M 4/0404* (2013.01);
(Continued)

(58) Field of Classification Search
CPC .......... H01M 4/13; H01M 4/36; H01M 4/505; H01M 4/131; H01M 4/1391; H01M 4/04; H01M 10/0525
See application file for complete search history.

(56) References Cited

U.S. PATENT DOCUMENTS

2011/0151296 A1 6/2011 Muraoka et al.
2013/0209865 A1 8/2013 Kim et al.
(Continued)

FOREIGN PATENT DOCUMENTS

EP 2804241 A1 11/2014
JP 2015-015183 * 1/2015 ............ H01M 4/13 4/36
(Continued)

OTHER PUBLICATIONS

International Search Report for Application No. PCT/KR2017/013342 dated Feb. 22, 2018.
(Continued)

*Primary Examiner* — Osei K Amponsah
(74) *Attorney, Agent, or Firm* — Lerner, David, Littenberg, Krumholz & Mentlik, LLP

(57) ABSTRACT

Provided is a method for manufacturing a positive electrode for a secondary battery, the method including applying a first positive electrode slurry including a first positive electrode active material on a positive electrode current collector, forming a first positive electrode mixture layer by primarily rolling the current collector applied with the first positive electrode slurry, applying a second positive electrode slurry including a second positive electrode active material on the above-formed first positive electrode mixture layer, and forming a second positive electrode mixture layer on which the first positive electrode mixture layer is laminated by
(Continued)

secondarily rolling the first positive electrode mixture layer applied with the second positive electrode slurry.

19 Claims, 3 Drawing Sheets

(51) Int. Cl.
*H01M 4/131* (2010.01)
*H01M 4/1391* (2010.01)
*H01M 4/505* (2010.01)
*H01M 4/525* (2010.01)
*H01M 4/02* (2006.01)
*H01M 10/052* (2010.01)

(52) U.S. Cl.
CPC ......... *H01M 4/0435* (2013.01); *H01M 4/131* (2013.01); *H01M 4/1391* (2013.01); *H01M 4/505* (2013.01); *H01M 4/525* (2013.01); *H01M 10/052* (2013.01); *H01M 2004/028* (2013.01)

(56) References Cited

U.S. PATENT DOCUMENTS

| | | |
|---|---|---|
| 2014/0356696 A1 | 12/2014 | Lee et al. |
| 2018/0006291 A1 | 1/2018 | Kim et al. |

FOREIGN PATENT DOCUMENTS

| | | |
|---|---|---|
| JP | 2015015183 A | 1/2015 |
| KR | 10-1236069 B1 | 2/2013 |
| KR | 2014-0017470 A | 2/2014 |
| KR | 2015-0029054 A | 3/2015 |
| KR | 2016-0050255 A | 5/2016 |
| KR | 2016-0050283 A | 5/2016 |
| KR | 20160111673 | 9/2016 |

OTHER PUBLICATIONS

Extended European Search Report including Written Opinion for Application No. EP17874304.3 dated Apr. 2, 2019.

* cited by examiner

POSITIVE ELECTRODE FOR SECONDARY BATTERY, MANUFACTURING METHOD THEREOF, AND LITHIUM SECONDARY BATTERY INCLUDING SAME

CROSS-REFERENCE TO RELATED APPLICATIONS

The present application is a national phase entry under 35 U.S.C. § 371 of International Application No. PCT/KR2017/013342, filed on Nov. 22, 2017, which claims the benefit of Korean Patent Application No. 10-2016-0156827, filed on Nov. 23, 2016, and 10-2017-0155472, filed on Nov. 21, 2017, the disclosures of which are incorporated herein by reference.

TECHNICAL FIELD

The present invention relates to a positive electrode for a secondary battery, a manufacturing method thereof, and a lithium secondary battery including the same.

BACKGROUND ART

As the technology development and demand for mobile devices increase, the demand for secondary batteries as an energy source is rapidly increasing. Among such secondary batteries, lithium secondary batteries having high energy density and voltage, long cycle life, and low self-discharging rate have been commercialized and widely used.

As positive electrode active materials of lithium secondary batteries, lithium transition metal composite oxides have been used. Among these oxides, a lithium cobalt composite metal oxide of $LiCoO_2$ having a high operating voltage and excellent capacity properties has been mainly used. However, since $LiCoO_2$ has very poor thermal properties due to an unstable crystal structure caused by lithium deintercalation, and also is expensive, there is a limitation in using a large amount of $LiCoO_2$ as a power source for applications such as electric vehicles.

As materials for replacing $LiCoO_2$, a lithium manganese composite oxide ($LiMnO_2$ or $LiMn_2O_4$), a lithium iron phosphate compound ($LiFePO_4$, etc.), and a lithium nickel composite oxide ($LiNiO_2$, etc.) have been developed. The research and development of a lithium nickel composite oxide among these materials which has a high reversible capacity of about 200 mAh/g, thereby allowing for a bigger capacity battery to be easily implemented, have been more actively conducted. However, when compared with $LiCoO2$, $LiNiO2$ has limitations in that the thermal stability thereof is poor, and when an internal short circuit occurs in a charged state due to pressure from the outside and the like, a positive electrode active material itself is decomposed causing the rupture and ignition of the battery.

Accordingly, as a method for improving the low thermal stability while maintaining the excellent reversible capacity of $LiNiO_2$a, a method for substituting a portion of nickel (Ni) with cobalt (Co) or manganese (Mn) has been proposed. However, in the case of $LiNi_{1-\alpha}Co_\alpha O_2$ ($\alpha$=0.1~0.3) in which a portion of nickel is substituted with cobalt, there are limitations in that the excellent charge and discharge properties and lifespan properties were obtained, but the thermal stability was low. Also, in the cases of a nickel manganese-based lithium composite metal oxide in which a portion of Ni is substituted with Mn having excellent thermal stability, and a nickel manganese cobalt manganese-based lithium composite metal oxide (hereinafter, simply referred to as a "NMC-based lithium oxide") in which a portion of Ni is substituted with Mn and Co, the cycle properties and thermal stability are relatively excellent. However, due to the low resistance thereof, when a metal body such as a nail penetrates, an internal short circuit does not occur, causing serious problems in terms of safety such as ignition or explosion due to instantaneous overcurrent.

DISCLOSURE OF THE INVENTION

Technical Problem

An aspect of the present invention provides a positive electrode for a secondary battery and a secondary battery including the same, the positive electrode having high capacity, high output performance, excellent cycle properties, and thermal stability, and having increased penetration resistance when a metal body such as a nail penetrates an electrode from the outside.

Technical Solution

According to an aspect of the present invention, there is provided a method for manufacturing a positive electrode for a secondary battery, the method including applying a first positive electrode slurry including a first positive electrode active material on a positive electrode current collector, forming a first positive electrode mixture layer by primarily rolling the current collector applied with the first positive electrode slurry, applying a second positive electrode slurry including a second positive electrode active material on the above-formed first positive electrode mixture layer, and forming a second positive electrode mixture layer on which the first positive electrode mixture layer is laminated by secondarily rolling the first positive electrode mixture layer applied with the second positive electrode slurry.

According to another aspect of the present invention, there is provided a positive electrode for a secondary battery including a positive electrode current collector, a first positive electrode mixture layer laminated on the positive electrode current collector and including a first positive electrode active material, and a second positive electrode mixture layer laminated on the first positive electrode mixture layer and including a second positive electrode active material. The difference of elongation percentage between the first positive electrode mixture layer and the second positive electrode mixture layer is 0.1 to 1.0%.

According to another aspect of the present invention, there is provided a lithium secondary battery including the positive electrode.

Advantageous Effects

A positive electrode for a secondary battery manufactured according to a manufacturing method of the present invention is capable of increasing penetration resistance when a metal body such as a nail penetrates an electrode from the outside by greatly reducing the elongation percentage of a lower layer portion of the electrode adjacent to a positive electrode current collector. Accordingly, the present invention may provide a positive electrode with improved stability for a secondary battery and a secondary battery including the same, the positive electrode capable of preventing the ignition or explosion of a battery due to overcurrent by suppressing the overcurrent.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
FIGS. 1 to 4 are views schematically showing a method for manufacturing a positive electrode for a secondary battery according to an embodiment of the present invention.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The accompanying drawings are for the purpose of clearly illustrating the present invention and are not intended to limit the present invention to the embodiments shown in the drawings. The shape and size of the elements in the drawings may be exaggerated for clarity, and parts that are not related to the description are omitted, and the same reference numerals are used for the same components in the same reference numerals.

A method for manufacturing a positive electrode for a secondary battery, the method according to an aspect of the present invention includes applying a first positive electrode slurry including a first positive electrode active material on a positive electrode current collector, forming a first positive electrode mixture layer by primarily rolling the current collector applied with the first positive electrode slurry, applying a second positive electrode slurry including a second positive electrode active material on the above-formed first positive electrode mixture layer, and forming a second positive electrode mixture layer on which the first positive electrode mixture layer is laminated by secondarily rolling the first positive electrode mixture layer applied with the second positive electrode slurry.

The average particle diameter ($D_{50}$) of the first positive electrode active material may be 5 to 80% of the average particle diameter ($D_{50}$) of the second positive electrode active material.

That is, according to an embodiment of the present invention, a first positive electrode active material having a relatively small average particle diameter ($D_{50}$) may be coated on a lower layer portion of an electrode to be adjacent to a positive electrode current collector, and a second positive electrode active material having a relatively large average particle diameter ($D_{50}$) may be coated on an upper layer portion of the electrode. As a result, the elongation percentage of a first positive electrode mixture layer adjacent to the positive electrode current collector may be reduced, and the elongation percentage of a second positive electrode mixture layer disposed on the upper layer portion of the electrode may be increased.

In the present invention, an average particle diameter ($D_{50}$) may be defined as a particle diameter corresponding to 50% of the volume accumulation in a particle diameter distribution curve. The average particle diameter ($D_{50}$), for example, may be measured by using a laser diffraction method. For example, a method for measuring the average particle diameter ($D_{50}$) of the positive electrode active material may be prepared by dispersing particles of the positive electrode active material in a dispersion medium, introducing the dispersed particles to a commercially available laser diffraction particle size measurement device (for example, Microtrac MT 3000) to irradiate the same with an ultrasonic wave of about 28 kHz to an output of 60 W, and measuring the average particle diameter ($D_{50}$) corresponding to 50% of the volume accumulation in the measurement device.

In the present invention, the elongation percentage of each of the positive electrode mixture layers refers to a value measured by using the UTM equipment, and the elongation percentage was measured through a change in length compared with the length of an existing positive electrode mixture layer when the positive electrode material mixture layer was mounted and stretched at a speed of about 5 mm/min until the electrode (positive electrode mixture layer) was stretched to the maximum.

On the other hand, when a positive electrode having a multilayered structure is typically formed, a slurry is applied on multiple layers and then rolled at one time so that the rolling rate of a layer disposed on a lower layer portion of the electrode is poor, and there is a limit in the reduction of the elongation percentage.

However, in the present invention, a first positive electrode slurry for forming a first positive electrode mixture layer adjacent to a positive electrode current collector was applied and then primarily rolled, and a second positive electrode slurry for forming a second positive electrode mixture layer was applied and then secondarily rolled to manufacture a positive electrode having a multilayered structure so that the rolling rate of the first positive electrode mixture layer on a lower layer portion of the electrode was improved. As a result, the elongation percentage of the first positive electrode mixture layer adjacent to the positive electrode current collector was greatly reduced effectively to significantly increase the penetration resistance when a metal body penetrates the electrode from the outside, and by suppressing overcurrent, the ignition or explosion of a battery due to the overcurrent was prevented.

FIG. 1 is a view schematically showing a method for manufacturing a positive electrode for a secondary battery according to an embodiment of the present invention.

Referring to FIG. 1, a method for manufacturing a positive electrode for a secondary battery according to an embodiment of the present invention includes applying a first positive electrode slurry 21' including a first positive electrode active material on a positive electrode current collector 10.

The average particle diameter ($D_{50}$) of the first positive electrode active material may be 5 to 80% of the average particle diameter ($D_{50}$) of the second positive electrode active material.

Specifically, the average particle diameter ($D_{50}$) of the first positive electrode active material may be 1 to 15 μm. More preferably, the average particle diameter ($D_{50}$) of the first positive electrode active material may be 1 to 10 μm, even more preferably 2 to 8 μm. When the average particle diameter ($D_{50}$) of the first positive electrode active material is less than 1 μm, an electrode side reaction may occur, or dispersion may be difficult in a manufacturing process of the electrode. When greater than 15 μm, the adhesion with the positive electrode current collector may be reduced, and the elongation percentage of the first positive electrode mixture layer is increased, so that the effect of stability improvement may be insignificant.

The positive electrode current collector 10 is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector 10 may typically have a thickness of 3 μm to 500 μm, and microscopic irregularities may be prepared on the surface of the positive electrode current collector 10 to improve the adhesion of a positive electrode active material. The positive electrode current collector 10 may be used in various forms of such as a film, a sheet, a foil, a net, a porous body, a foam, and a non-woven body.

The first positive electrode slurry 21' may further include a conductive material, a binder, and a solvent in addition to the first positive electrode active material, and if necessary, an additive such as a filler may further be included in the slurry.

Figure 2:
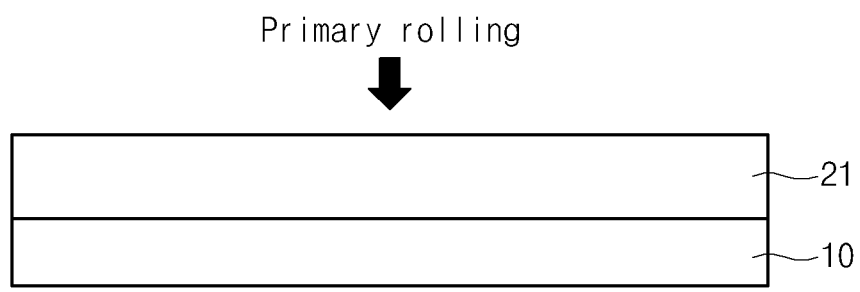

Next, referring to FIG. 2, the first positive electrode slurry 21' is applied and then primarily rolled to form a first positive electrode mixture layer 21.

As such, in an embodiment of the present invention, a positive electrode active material having a relatively small average particle diameter is included in the first positive electrode slurry 21' adjacent to the first positive electrode current collector 10 and then primarily rolled to form the first positive electrode mixture layer 21 so that the first positive electrode mixture layer 21 having a significantly reduced elongation percentage may be formed.

Figure 3:
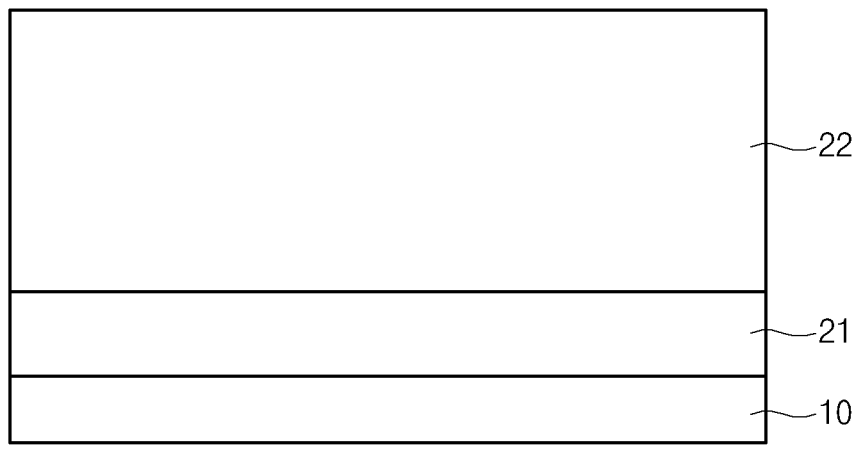

Next, referring to FIG. 3, a second positive electrode slurry 22' including a second positive electrode active material is applied on the above-formed first positive electrode mixture layer 21.

The second positive electrode active material may be an allele particle having an average particle diameter ($D_{50}$) relatively larger than that of the first positive electrode active material.

Specifically, the average particle diameter ($D_{50}$) of the second positive electrode active material may be 10 to 100 μm. More preferably, the average particle diameter ($D_{50}$) of the second positive electrode active material may be 10 to 50 μm, even more preferably, 10 to 30 μm. When the average particle diameter ($D_{50}$) of the second positive electrode active material is less than 10 μm, there may be processing difficulties in the rolling process during the manufacturing process of an electrode, and when greater than 100 μm, output properties may be deteriorated.

The second positive electrode slurry 22' may further include a conductive material, a binder, and a solvent in addition to the second positive electrode active material, and if necessary, an additive such as a filler may further be included in the slurry.

The first positive electrode active material and/or the second positive electrode active material may include a lithium transition metal oxide represented by Formula 1 below.

$$Li_aNi_{1-x-y}Co_xMn_yM_zO_2 \quad \text{[Formula 1]}$$

(in the above formula, M is any one or more elements selected from the group consisting of Al, Zr, Ti, Mg, Ta, Nb, Mo and Cr, and $0.9 \leq a \leq 1.5$, $0 \leq a \leq 0.5$, $0 \leq y \leq 0.5$, $0 \leq z \leq 0.1$, and $0 \leq x+y \leq 0.7$)

However, the first positive electrode active material and/or the second positive electrode active material are not necessarily limited to the lithium transition metal oxide represented by Formula 1. The first positive electrode active material and/or the second positive electrode active material may include a layered compound such as lithium cobalt oxide ($LiCoO_2$) and lithium nickel oxide ($LiNiO_2$), or a compound substituted with one or more transition metals; a lithium manganese oxide such as the formula $Li_{1+x1}Mn_{2-x1}O_4$ (wherein, x1 is 0 to 0.33), $LiMnO_3$, $LiMn_2O_3$, and $LiMnO_2$; lithium copper oxide ($Li_2CuO_2$); a vanadium oxide such as $LiV_3O_8$, $LiV_3O_4$, $V_2O_5$, and $Cu_2V_2O_7$; an Ni-site type lithium nickel oxide represented by the formula $LiNi_{1-x2}M^1_{x2}O_2$ (wherein, $M^1$=Co, Mn, Al, Cu, Fe, Mg, B or Ga, and x2=0.01 to 0.3); a lithium manganese complex oxide represented by the formula $LiMn_{2-x3}M^2_{x3}O_2$ (wherein, $M^2$=Co, Ni, Fe, Cr, Zn or Ta, and x3=0.01 to 0.1), or $Li_2Mn_3M^3O_8$ (wherein, $M^3$=Fe, Co, Ni, Cu or Zn); a lithium manganese complex oxide having a spinel structure and represented by $LiNi_{x4}Mn_{2-x4}O_4$ (wherein, x4=0.01 to 1); $LiMn_2O_4$ of which a part of Li in the formula is substituted with an alkaline earth metal ion; a disulfide compound; $Fe_2(MoO_4)_3$, and the like.

Meanwhile, the first and the second positive electrode active materials may include lithium transition metal oxides having the same composition, or may include lithium transition metal oxides having different compositions.

The conductive material included in the first positive electrode slurry and/or the second positive electrode slurry is not particularly limited as long as it has conductivity without causing a chemical change in a battery. For example, graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and the like may be used. The conductive material may be included in an amount of 1 wt % to 30 wt % based on the total weight of the positive electrode active material layer.

Meanwhile, the binder included in the first positive electrode slurry and/or the second positive electrode slurry serves to improve the bonding among positive electrode active material particles and the adhesion between the positive electrode active material and the positive electrode current collector 10. Specific examples of the binder may include polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive material, and the binder in consideration of an applying thickness of a slurry and manufacturing yield, and may allow to have a viscosity capable of exhibiting excellent thickness uniformity during the subsequent applying for the preparation of the positive electrode.

Figure 4:
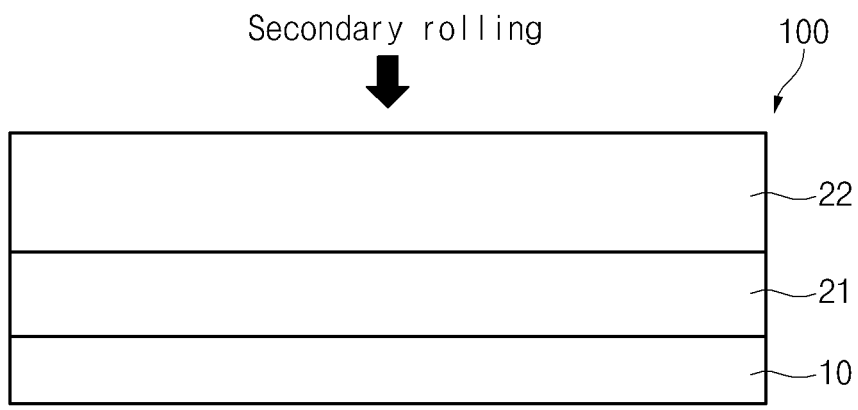
Figure 5:
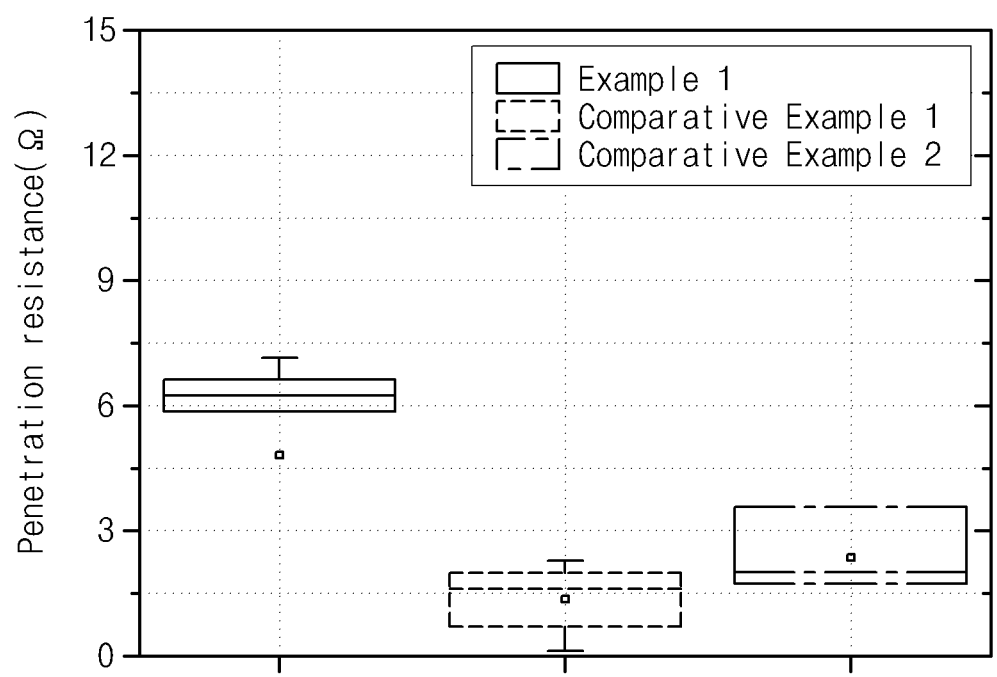
FIG. 5 is a graph showing the penetration resistance of a positive electrode for a secondary battery manufactured according to examples and comparative examples of the present invention.

Next, referring to FIG. 4, the second positive electrode slurry 22' is applied and then secondarily rolled to form the second positive electrode mixture layer 22 laminated on the first positive electrode mixture layer 21 to finally manufacture the positive electrode 100.

The positive electrode 100 according to an embodiment of the present invention manufactured as described above includes the first positive electrode active material having a relatively small average particle diameter ($D_{50}$) in the first positive electrode mixture layer 21 which is a lower layer portion of the electrode, and includes the second positive electrode active material having a relatively large average particle diameter ($D_{50}$) in the second positive electrode mixture layer 22 which is an upper layer portion of the electrode such that the elongation percentage of the first positive electrode mixture layer 21 is reduced, and the elongation percentage of the second positive electrode mixture layer 22 is increased. Furthermore, in the present invention, instead of proceeding the rolling process after all of the positive electrode slurry for forming a multilayer is applied, the first positive electrode slurry 21' is applied and then primarily rolled to form the first positive electrode mixture layer 21 so that it is possible to maximize the reduction of the elongation percentage of the first positive electrode mixture layer 21. As a result, by greatly reducing the elongation percentage of the first positive electrode mixture layer adjacent to the positive electrode current collector effectively, the penetration resistance is significantly increased when a metal body penetrates the electrode from the outside, and by suppressing overcurrent, the ignition or explosion of a battery due to the overcurrent may be prevented.

The difference of elongation percentage of the first positive electrode mixture layer 21 and the second positive electrode mixture layer 22 both manufactured according to an embodiment of the present invention may be 0.1 to 1.0%, more preferably, 0.2 to 0.7%. In the present invention, the elongation percentage of each of the positive electrode mixture layers refers to a value measured by using the UTM equipment, and the elongation percentage was measured through a change in length compared with the length of an existing positive electrode mixture layer when the positive electrode material mixture layer was mounted and stretched at a speed of about 5 mm/min until the electrode (positive electrode mixture layer) was stretched to the maximum.

As such, by preparing an upper layer portion of the electrode with a positive electrode active material which is an allele particle having a small specific surface area while maximizing the reduction of the elongation percentage of a lower layer portion of the electrode, the difference of elongation percentage between the lower layer portion and the upper layer portion of the electrode is maximized such that the penetration resistance is increased, and the cell performance such as lifespan properties may be improved.

Specifically, the elongation percentage of the first positive electrode mixture layer 21 may be 0.2 to 1.2%, more preferably, 0.2 to 0.5%.

When the elongation percentage of the first positive electrode mixture layer 21 adjacent to the positive electrode current collector 10 satisfies the above range, the penetration resistance may be significantly increased when a metal body penetrates the electrode from the outside, and the generation of overcurrent may be prevented through the increase in the penetration resistance so that stability may be improved.

Also, the elongation percentage of the second positive electrode mixture layer 22 may be 0.6 to 2.0%, more preferably, 0.6 to 0.9%.

When the elongation percentage of the second positive electrode mixture layer 22 disposed on the upper layer portion of the electrode satisfies the above range, the elongation percentage of the entire positive electrode may be maintained at a predetermined level or more, and the problem of breakage in the rolling process during the manufacturing process of the electrode may be prevented.

In addition, the elongation percentage of the entire positive electrode 100 including the first positive electrode mixture layer 21 and the second positive electrode mixture layer 22 both manufactured as described above may be less than 1.4%. By allowing the average particle diameter ($D_{50}$) of positive electrode active materials included in the first positive electrode mixture layer 21 and the second positive electrode mixture layer 22 to be different as described above, and by manufacturing the positive electrode 100 through a manufacturing process having two times of rolling, the difference of the elongation percentage between the first positive electrode mixture layer 21 and the second positive electrode mixture layer 22 may be set to 0.1 to 1.0%, more preferably 0.2 to 0.7%. Furthermore, the elongation percentage of the entire positive electrode 100 may be less than 1.4%.

Meanwhile, the thickness ratio of the first positive electrode mixture layer 21 and the second positive electrode mixture layer 22 may be 1:1 to 1:8. Specifically, the thickness of the first positive electrode mixture layer 21 may be 15 to 40 μm, and the thickness of the second positive electrode mixture layer 22 may be 30 to 80 μm.

In addition, an embodiment of the present invention provides the positive electrode 100 for a secondary battery manufactured according to the manufacturing method.

Specifically, the positive electrode 100 according to an embodiment of the present invention includes a positive electrode current collector 10; a first positive electrode mixture layer 21 laminated on the positive electrode current collector 10 and including a first positive active material; and a second positive electrode mixture layer 22 laminated on the first positive electrode mixture layer 21 and including a second positive electrode active material. The difference of elongation percentage between the first positive electrode 21 and the second positive electrode mixture layer 22 is 0.1 to 1.0%. Also, more preferably, the difference of elongation percentage between the first positive electrode 21 and the second positive electrode mixture layer 22 may be 0.2 to 0.7%.

The average particle diameter ($D_{50}$) of the first positive electrode active material may be 5 to 80% of the average particle diameter ($D_{50}$) of the second positive electrode active material, and more preferably, the average particle diameter ($D_{50}$) of the first positive electrode active material may be 1 to 15 μm, and the average particle diameter ($D_{50}$) of the second positive electrode active material may be 10 to 100 μm.

In the positive electrode 100 according to an embodiment of the present invention, by forming the first positive electrode mixture layer 21 including the first positive electrode active material having a relatively small average particle diameter ($D_{50}$) by primarily rolling, and by forming the second positive electrode material mixture layer including the second positive electrode active material having a relatively large average particle diameter ($D_{50}$) by secondarily rolling, the difference of elongation percentage between the first positive electrode mixture layer 21 and the second positive electrode mixture layer 22 may be set to 0.1 to 1.0%. More preferably, the difference of elongation percentage between the first positive electrode mixture layer and the second positive electrode positive electrode mixture layer 22 may be 0.2 to 0.7%.

Specifically, the elongation percentage of the first positive electrode mixture layer 21 may be 0.2 to 1.2%, more preferably 0.2 to 0.5%. The elongation percentage of the second positive electrode mixture layer 22 may be 0.6 to 2.0%, more preferably 0.6 to 0.9%.

Also, the elongation percentage of the entire positive electrode 100 including the first positive electrode mixture layer 21 and the second positive electrode mixture layer 22 may be less than 1.4%.

In addition, the porosity of the first positive electrode mixture layer 21 may be 18 to 34%, and the porosity of the second positive electrode mixture layer 22 may be 20 to 40%.

The first positive electrode mixture layer 21 includes the positive electrode active material having a relatively small diameter, and the first positive electrode slurry is applied and then primarily rolled to form the first positive electrode mixture layer 21 such that the rolling rate is improved. As a result, the elongation percentage is further reduced, and the porosity is decreased.

Accordingly, by maximizing the difference of the elongation percentage between the lower layer portion and the upper layer portion of the electrode, the penetration resistance was significantly increased, and by suppressing overcurrent, the ignition or explosion of the battery due to the overcurrent was prevented. Also, the cell performance such as lifespan properties was improved.

The description of the overlapping portions of the method for manufacturing a positive electrode for a secondary battery according to an embodiment of the present invention described above is omitted, but may be applied as the same as described in the manufacturing method.

In addition, an embodiment of the present invention provides an electrochemical device including the positive electrode 100. The electrochemical device may specifically be a battery or a capacitor, more preferably, a lithium secondary battery.

The lithium secondary battery specifically includes a positive electrode, a negative electrode disposed to face the positive electrode, a separator disposed between the positive electrode and the negative electrode, and an electrolyte, and the positive electrode is as described above. Also, the lithium secondary battery may further selectively include a battery case accommodating an electrode assembly of the positive electrode, the negative electrode, and the separator, and a sealing member for sealing the battery case.

In the lithium secondary battery, the negative electrode includes a negative electrode current collector and a negative electrode mixture layer disposed on the negative electrode current collector.

The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, and an aluminum-cadmium alloy may be used. Also, the negative electrode collector may typically have a thickness of 3 µm to 500 µm, and as in the case of the positive electrode current collector 10, microscopic irregularities may be prepared on the surface of the negative electrode current collector to improve the adhesion of a negative electrode active material. The negative electrode current collector may be used in various forms of such as a film, a sheet, a foil, a net, a porous body, a foam body, and a non-woven fabric body.

The negative electrode mixture layer includes a binder and a conductive material in addition to a negative electrode active material. The negative electrode mixture layer may be prepared by, for example, applying a composition for forming a negative electrode mixture layer, which selectively includes the binder and the conductive agent as well as the negative electrode active material, on the negative electrode current collector and drying the applied negative electrode current collector, or may be prepared by casting the composition for forming a negative electrode mixture layer on a separate support and then laminating a film separated from the support on the negative electrode current collector.

As the negative electrode active material, a compound capable of reversibly intercalating and deintercalating lithium may be used. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiOx(0<x<2)$, $SnO2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive material may be the same as those previously described in the description of the positive electrode.

In the lithium secondary battery, a separator separates the negative electrode and the positive electrode, and provides a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric prepared of high melting point glass fibers or polyethylene terephthalate fibers may be used. Furthermore, a coated separator including a ceramic component or a polymer material may be used to secure heat resistance or mechanical strength, and may be selectively used as a single layer or a multilayered structure.

Also, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of a lithium secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable. In this case, when a cyclic carbonate and a chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is included within the above range, the electrolyte has suitable conductivity and viscosity so that the electrolyte may show excellent performance, and lithium ions may effectively move.

In order to improve the lifespan properties of the battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in the electrolyte in addition to the above electrolyte components. In this case, the additive may be included in an amount of 0.1 wt % to 5 wt % based on the total weight of the electrolyte.

As described above, the lithium secondary battery including the positive electrode active material according to the present invention stably exhibits excellent discharge capacity, output properties, and capacity retention rate, thereby being useful for portable devices such as a mobile phone, a notebook computer, and a digital camera, and for electric cars such as a hybrid electric vehicle (HEV).

Thus, according to another embodiment of the present invention, a battery module including the lithium secondary battery as a unit cell, and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1

$LiNi_{0.6}Mn_{0.2}Co_{0.2}O_2$ having an average particle diameter ($D_{50}$) of 5 μm as a first positive electrode active material, carbon black, and PVdF as a binder were mixed in N-methylpyrrolidone, which is a solvent, in a weight ratio of 89:6:5 to prepare a first positive electrode slurry.

The first positive electrode slurry was applied on an aluminum current collector, dried at 130° C., and then rolled to form a first positive electrode mixture layer.

Also, $LiNi_{0.6}Mn_{0.2}Co_{0.2}O_2$ having an average particle diameter ($D_{50}$) of 11 μm as a second positive electrode active material, carbon black, and PVdF as a binder were mixed in N-methylpyrrolidone, which is a solvent, in a weight ratio of 89:6:5 to prepare a second positive electrode slurry.

The second positive electrode slurry was applied on the first positive electrode mixture layer, dried at 130° C., and then rolled to form a second positive electrode mixture layer to finally prepare a positive electrode (overall elongation percentage 1.1%). The thickness of the first positive electrode mixture layer was 30 μm, and the thickness of the second positive electrode mixture layer was 30 μm.

EXAMPLE 2

A positive electrode was manufactured in the same manner as in Example 1 except that a first positive electrode active material having an average particle diameter ($D_{50}$) of 4 μm was used to form a first positive electrode mixture layer, and a second positive electrode active material having an average particle diameter ($D_{50}$) of 12 μm was used to form a second positive electrode mixture layer, to finally prepare a positive electrode (overall elongation percentage 1.05%).

COMPARATIVE EXAMPLE 1

A positive electrode was manufactured in the same manner as in Example 1 except that $LiNi_{0.6}Mn_{0.2}Co_{0.2}O_2$ having an average particle diameter ($D_{50}$) of 80 μm was used as a first positive electrode active material to prepare a positive electrode slurry, and the positive slurry was applied on an aluminum current collector and rolled to prepare a positive electrode of a single positive electrode mixture layer.

COMPARATIVE EXAMPLE 2

A positive electrode was manufactured in the same manner as in Example 1 except that a first positive electrode active material was applied on an aluminum current collector, and without being rolled, a second positive electrode slurry was applied thereon and rolled to prepare a positive electrode including a first positive electrode mixture layer and a second positive electrode mixture layer.

COMPARATIVE EXAMPLE 3

A positive electrode was manufactured in the same manner as in Example 1 except that $LiNi_{0.6}Mn_{0.2}Co_{0.2}O_2$ having an average particle diameter ($D_{50}$) of 80 μm was used as a first positive electrode active material to prepare a positive electrode slurry, and the positive slurry was applied on an aluminum current collector and rolled to form a first positive electrode mixture layer, and thereafter, the positive electrode slurry was applied on the first electrode mixture layer and rolled to form a second positive electrode mixture layer to finally prepare a positive electrode (overall elongation percentage 1.3%.

PREPARATION EXAMPLE

Manufacturing of a Lithium Secondary Battery

Lithium secondary batteries were respectively manufactured by using the positive electrodes prepared in Examples 1 and 2 and Comparative Examples 1 to 3.

First, natural graphite as a negative electrode active material, carbon black as a conductive material, and PVdF as a binder were mixed in N-methylpyrrolidone, which is a solvent in a weight ratio of 85:10:5 to prepare a composition for forming a negative electrode, and the composition was applied on a copper current collector to prepare a negative electrode.

Each lithium secondary battery was manufactured by preparing an electrode assembly by disposing a porous polyethylene separator between the positive electrodes prepared in Examples 1 and 2 and Comparative Examples 1 to 3 and the negative electrode prepared as above, disposing the electrode assembly in a case, and then injecting an electrolyte solution into the case. At this time, the electrolyte solution was prepared by dissolving lithium hexafluorophosphate ($LiPF_6$) of 1.0 M concentration in an organic solvent of ethylene carbonate/dimethyl carbonate/ethylmethyl carbonate (mixing volume ratio of EC/DMC/EMC=3/4/3).

EXPERIMENTAL EXAMPLE

Evaluation of Penetration Resistance and Stability

The lithium secondary batteries respectively manufactured by using the positive electrodes prepared in Examples 1 and 2 and Comparative Examples 1 to 3 were subjected to a test under the same conditions as those for the Chinese GB/T certification to measure the penetration resistance thereof through a change in resistance, the test in which a metal body having a diameter of 5 to 8 mm was dropped at a rate of 25±5 mm/sec to penetrate a cell.

In addition, the lithium secondary batteries respectively manufactured by using the positive electrodes prepared in Examples 1 and 2 and Comparative Examples 1 to 3 were subjected to a test under the same conditions as those for the Chinese GB/T certification to evaluate whether there was ignition or not, the test in which a metal body having a diameter of 5 to 8 mm was dropped at a rate of 25±5 mm/sec to penetrate a cell.

The results are shown in Table 1 below.

TABLE 1

|  | Elongation percentage of first positive electrode mixture layer (%) | Elongation percentage of second positive electrode mixture layer (%) | Elongation percentage difference (%) | Penetration resistance (Unit: Ω) | Explosion or on explosion |
|---|---|---|---|---|---|
| Example 1 | 1.0 | 1.5 | 0.5 | 6.16 | No explosion |
| Example 2 | 0.9 | 1.6 | 0.7 | 6.0 | No explosion |
| Comparative Example 1 | Single layer 1.4 | | — | 1.42 | Explosion |
| Comparative Example 2 | 1.41 | 1.5 | 0.09 | 2.48 | Explosion |
| Comparative Example 3 | 1.32 | 1.4 | 0.08 | 2.0 | Explosion |

As can be seen in Table 1, the positive electrodes of Examples 1 and 2 which were manufactured by using a positive electrode active material having a relatively small diameter, primarily rolling the same to form a first positive electrode mixture layer, and by using a positive electrode active material having a relatively large diameter, secondarily rolling the same to form a second positive electrode mixture layer, showed a greatly increased penetration resistance. As a result, it was possible to prevent the explosion of the battery due to overcurrent by suppressing the overcurrent.

The invention claimed is:
1. A method for manufacturing a positive electrode for a secondary battery, comprising:
   applying a first positive electrode slurry including a first positive electrode active material on a positive electrode current collector;
   in a first rolling step, rolling the first positive electrode slurry to form a first positive electrode mixture layeron the positive electrode current collector;
   applying a second positive electrode slurry including a second positive electrode active material on the first positive electrode mixture layer; and
   in a second rolling step, rollingthe second positive electrode slurry applied on the first positive electrode mixture layerto form a second positive electrode mixture layer, wherein the second positive electrode mixture layer is laminated with the first positive electrode mixture layer,
   wherein the difference of elongation percentage of the first positive electrode mixture layer and the second positive electrode mixture layer is 0.2 to 0.7%.
2. The method of claim 1, wherein the average particle diameter ($D_{50}$) of the first positive electrode active material is 5 to 80% of the average particle diameter ($D_{50}$) of the second positive electrode active material.

3. The method of claim 1, wherein the average particle diameter ($D_{50}$) of the first positive electrode active material is 1 to 15 μm.

4. The method of claim 1, wherein the average particle diameter ($D_{50}$) of the second positive electrode active material is 10 to 100 μm.

5. The method of claim 1, wherein the elongation percentage of the first positive electrode mixture layer is 0.2 to 1.2%.

6. The method of claim 1, wherein the elongation percentage of the second positive electrode mixture layer is 0.6 to 2.0%.

7. The method of claim 1, wherein the total elongation percentage of a positive electrode including the first positive electrode mixture layer and the second positive electrode mixture layer is less than 1.4%.

8. The method of claim 1, wherein at least one of the first positive electrode active material and the second positive electrode active material comprises a lithium transition metal oxide represented by Formula 1 below:

$$Li_aNi_{1-x-y}Co_xMn_yM_zO_2 \qquad [\text{Formula 1}]$$

(in which, M is any one or more elements selected from the group consisting of Al, Zr, Ti, Mg, Ta, Nb, Mo and Cr, and in which 0.9≤a≤1.5, 0≤x≤0.5, 0≤y≤0.5, 0≤z≤0.1, and 0≤x+y≤0.7.).

9. A positive electrode for a secondary battery, comprising:
a positive electrode current collector;
a first positive electrode mixture layer laminated on the positive electrode current collector and including a first positive electrode active material;
a second positive electrode mixture layer laminated on the first positive electrode mixture layer and including a second positive electrode active material; and wherein the difference of elongation percentage between the first positive electrode mixture layer and the second positive electrode mixture layer is 0.2 to 0.7%.

10. The positive electrode for a secondary battery of claim 9, wherein the average particle diameter ($D_{50}$) of the first positive electrode active material is 5 to 80% of the average particle diameter ($D_{50}$) of the second positive electrode active material.

11. The positive electrode for a secondary battery of claim 9, wherein the average particle diameter ($D_{50}$) of the first positive electrode active material is 1 to 15 μm.

12. The positive electrode for a secondary battery of claim 9, wherein the average particle diameter ($D_{50}$) of the second positive electrode active material is 10 to 100 μm.

13. The positive electrode for a secondary battery of claim 9, wherein the elongation percentage of the first positive electrode mixture layer is 0.2 to 1.2%, and wherein the elongation percentage of the second positive electrode mixture layer is 0.6 to 2.0%.

14. The positive electrode for a secondary battery of claim 9, wherein the total elongation percentage of a positive electrode including the first positive electrode mixture layer and the second positive electrode mixture layer is less than 1.4%.

15. The positive electrode for a secondary battery of claim 9, wherein the porosity of the first positive electrode mixture layer is 18 to 34%.

16. The positive electrode for a secondary battery of claim 9, at least one of the first positive electrode active material and the second positive electrode active material comprises a lithium transition metal oxide represented by Formula 1 below:

$$Li_aNi_{1-x-y}Co_xMn_yM_zO_2 \qquad [\text{Formula 1}]$$

(in which, M is any one or more elements selected from the group consisting of Al, Zr, Ti, Mg, Ta, Nb, Mo and Cr, and in which 0.9≤a≤1.5, 0≤x≤0.5, 0≤y≤0.5, 0≤z≤0.1, and 0≤x+y≤0.7.).

17. A lithium second battery comprising:
an electrode assembly including a positive electrode, a negative electrode, and a separator interposed between the positive electrode and the negative electrode;
a battery case for housing the electrode assembly; and
a non-aqueous electrolyte injected into the battery case, wherein the positive electrode is a positive electrode according to claim 9.

18. The method of claim 1, wherein the difference of elongation percentage of the first positive electrode mixture layer and the second positive electrode mixture layer is 0.5 to 0.7%.

19. The positive electrode of claim 9, wherein the difference of elongation percentage of the first positive electrode mixture layer and the second positive electrode mixture layer is 0.5 to 0.7%.

* * * * *